(12) United States Patent
Patwardhan et al.

(10) Patent No.: US 11,683,835 B2
(45) Date of Patent: Jun. 20, 2023

(54) SPATIAL REUSE FOR HIGH PRIORITY TRAFFIC

(71) Applicant: HEWLETT PACKARD ENTERPRISE DEVELOPMENT LP, Houston, TX (US)

(72) Inventors: Gaurav Patwardhan, Santa Clara, CA (US); Eldad Perahia, Park City, UT (US); Abhiruchi Dakshinkar, Santa Clara, CA (US); Nitin A. Changlani, Santa Clara, CA (US); Sachin Ganu, Santa Clara, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 17/221,596

(22) Filed: Apr. 2, 2021

(65) Prior Publication Data

US 2022/0322436 A1 Oct. 6, 2022

(51) Int. Cl.
*H04W 74/08* (2009.01)
*H04W 28/08* (2023.01)
*H04W 28/02* (2009.01)
*H04W 28/18* (2009.01)

(52) U.S. Cl.
CPC ... *H04W 74/0816* (2013.01); *H04W 28/0268* (2013.01); *H04W 28/0975* (2020.05); *H04W 28/18* (2013.01); *H04W 74/0808* (2013.01)

(58) Field of Classification Search
CPC ......... H04W 74/0816; H04W 28/0268; H04W 28/0975; H04W 28/18; H04W 74/0808; H04W 84/12
See application file for complete search history.

(56) References Cited

U.S. PATENT DOCUMENTS

| | | | |
|---|---|---|---|
| 10,123,352 B2 | 11/2018 | Ahmed et al. | |
| 10,172,137 B1 | 1/2019 | Hedayat et al. | |
| 10,470,138 B2 | 11/2019 | Kwon | |
| 2017/0311352 A1 | 10/2017 | Ly et al. | |
| 2018/0077654 A1 | 3/2018 | Kulkarni et al. | |
| 2019/0037575 A1* | 1/2019 | Sugaya | H04W 72/08 |
| 2021/0051664 A1* | 2/2021 | Bhattacharya | H04L 1/203 |
| 2021/0092770 A1* | 3/2021 | Ko | H04W 84/12 |
| 2021/0136679 A1* | 5/2021 | Verma | H04W 72/0453 |
| 2021/0360694 A1* | 11/2021 | Pandian | H04W 72/082 |
| 2022/0159718 A1* | 5/2022 | Fang | H04W 76/15 |

* cited by examiner

*Primary Examiner* — Omer S Mian
(74) *Attorney, Agent, or Firm* — Sheppard Mullin Richter & Hampton LLP

(57) ABSTRACT

Currently, spatial reuse (SR) is a feature used indiscriminately for/across all traffic classes. However, systems and methods are provided for reducing channel access latency via selective application of SR for latency-sensitive and high-priority traffic. If a radio frequency (RF) signal is detected on a channel used by an access point (AP) or a client device, a determination can be made as to whether the energy of the RF signal relative to SR energy level thresholds permits transmission on that channel used simultaneously by another, e.g., neighboring AP. If so, frames can be transmitted so long as the other neighboring AP is associated with a different basic service set (BSS) color than that of the AP, and so long as the frames to be transmitted belong to a high-priority/low-latency traffic access category.

21 Claims, 6 Drawing Sheets

SPATIAL REUSE FOR HIGH PRIORITY TRAFFIC

DESCRIPTION OF RELATED ART

The explosion and proliferation of wireless electronic devices has led to an increasing number of challenges in trying to accommodate the increasing number of users on wireless communication channels. For example, high levels of interference brought about by large numbers of users threatens to degrade the levels of network performance that users have come to expect. The IEEE 802.11 networks have continued to evolve in an attempt to address these challenges. These challenges have been addressed to some extent by introducing Spatial Reuse (SR) and Basic Service Sets (BSS) Color schemes in IEEE 802.11ax and IEEE 802.11ah implementations, respectively. These schemes are intended to improve network throughput and spectrum efficiency in dense environments.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
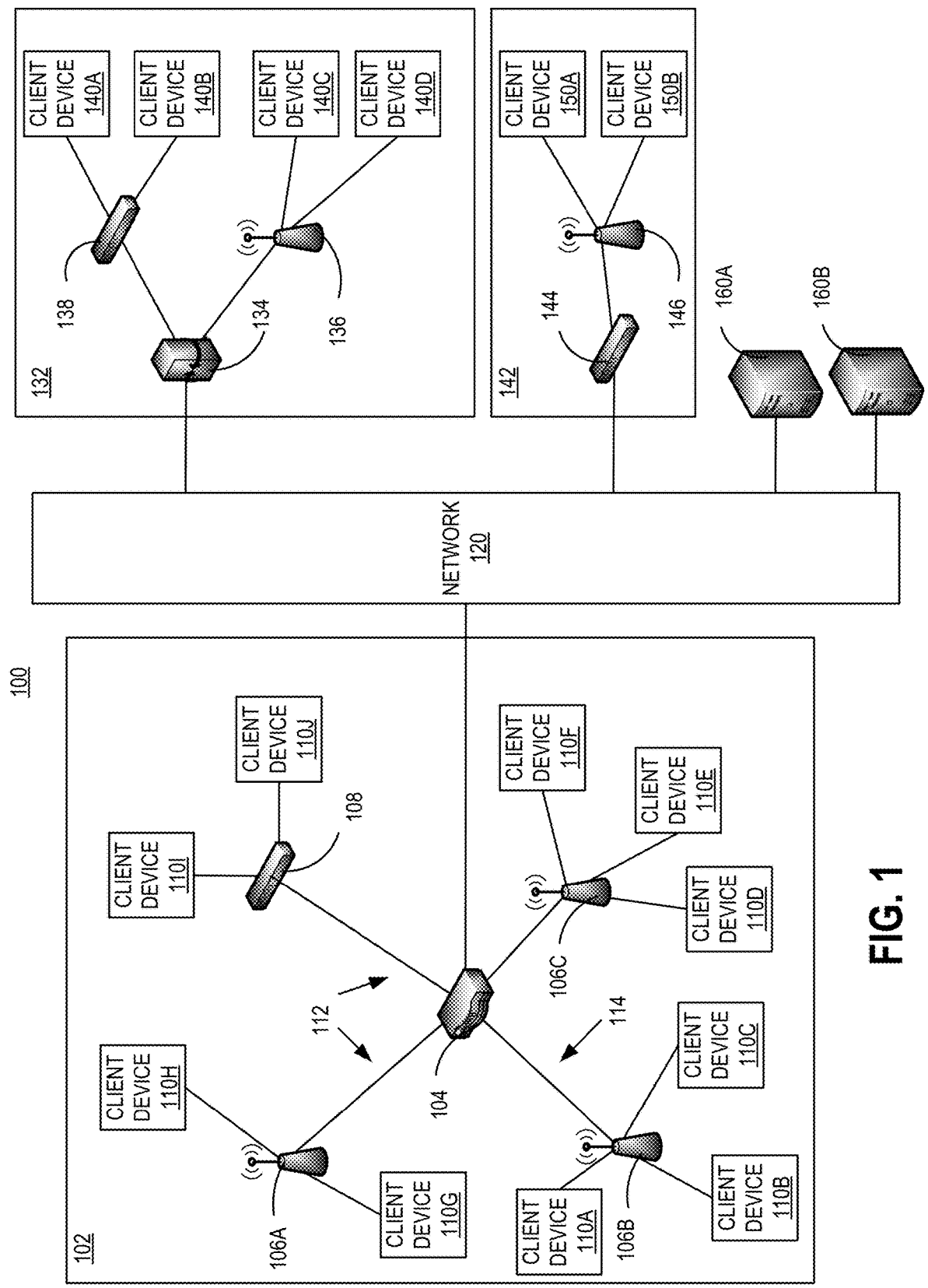
FIG. 1 illustrates one example of a wireless network deployment that may be implemented for an organization, such as a business, educational institution, governmental entity, healthcare facility or other organization.

The figures are not exhaustive and do not limit the present disclosure to the precise form disclosed.

DETAILED DESCRIPTION

As noted above, certain schemes are intended to improve network throughput and spectrum efficiency in dense environments, one being frequency or spatial reuse (SR). This SR feature allows two or more devices existing in different, adjoining basic service sets (BSSs) in the same frequency channel to transmit simultaneously if certain conditions are met. These conditions are described by using different CCA (Clear Channel Assessment) levels for inter-BSS and intra-BSS frames on the same channel. The distinction between inter and intra-BSS frames is given by the color parameter embedded in a packet by the respective BSS. Depending on the CCA thresholds for inter-BSS vs intra-BSS frames, one access point (AP) or device may defer medium access to the other AP or device depending on the BSS where the packet originated.

In particular, the introduction of SR was intended to enhance system level throughput by allowing Overlapping BSS (OBSS) traffic to overlap in time and frequency with another BSS by, in essence, reducing the time to access the channel medium. One of the methods to accomplish this is OBSS Packet-Detect (OBSS_PD). OBSS_PD-based SR is achieved by manipulating the preamble detect thresholds and transmit power, e.g., Effective Isotropic Radiated Power (EIRP) of APs and non-AP stations (STAB) in the entire BSS. SR relies on the fact, that if there is high Signal-to-Noise Ratio (SNR) between two entities at a given EIRP, the receiver can withstand some interference caused by a simultaneous transmission in the vicinity, and can receive and decode packets simultaneously. This also involves not causing interference in return, and that is achieved by changing EIRP dynamically. However, simulation results and real experiments appear to show that SR only has a marginal advantage (or none at all) for throughput, in large wireless deployments.

Embodiments of the present disclosure address this issue by avoiding the enabling or application of SR indiscriminately for/across all traffic classes. Instead, various embodiments of the present disclosure reducing channel access latency via selective application of SR for latency-sensitive and high-priority traffic that may not be throughput intensive but may need deterministic access to the channel. In some embodiments, a radio frequency (RF) signal may be detected on a channel used by an AP or a client device. A determination can be made as to whether the energy of the RF signal relative to SR energy level thresholds permits transmission on that channel used simultaneously by another, e.g., neighboring AP. If so, frames can be transmitted so long as the other neighboring AP is associated with a different BSS color than that of the AP, and so long as the frames to be transmitted belong to a high-priority/low-latency traffic access category. It should be understood that although embodiments are described in the context of WLAN/802.11 traffic access categories, such as video (VI) and voice (VO) traffic, embodiments of the present disclosure can be applied to/adapted to work in other contexts as well, i.e., for any currently known (or future known) latency-sensitive or high-priority traffic.

Before describing embodiments of the disclosed systems and methods in detail, it is useful to discuss certain terminology used herein. As used herein, the term "Rx sensitivity" can refer to power threshold below which, a device, such as a STA, cannot detect any energy which may/may not be a WLAN signal. As used herein, the term "CCA threshold" can refer to an energy threshold above which, a device will not transmit a packet(s). As discussed herein, prior to transmitting a packet, devices, such as STAs, perform a CCA to detect an energy on a channel (if present). As used herein, the term "OBSS_PD" can refer to a threshold above which, an OBSS transmission has been detected. It should be understood that packets include a preamble transmitted at the beginning of every frame. That is, SR introduces the concept of an OBSS-PD threshold to CCA signal detect (CCA+SD, also referred to as preamble detect). In the OBSS context, each BSS will use a unique BSS color, where SR allows the STAs in each BSS to use a less sensitive preamble detection threshold for OBSS frames during their normal CCA_SD check. That way, even though there may be an OBSS frame making the channel busy, if it is not very loud and there is still significant SNR, an 802.11ax STA that supports SR can transmit anyway. As used herein, the term "ED threshold" can refer to an energy detect threshold used to detect any other type of RF transmission(s) during the CCA. In other words, ED threshold refers to the ability of a receiver to detect non-Wi-Fi/WLAN energy on a channel.

Before describing embodiments of the disclosed systems and methods in detail, it is also useful to describe an example network installation with which these systems and methods might be implemented in various applications. FIG. 1 illustrates one example of a network configuration 100 that may be implemented for an organization, such as a business, educational institution, governmental entity, healthcare facility or other organization. This diagram illustrates an example of a configuration implemented with an organization having multiple users (or at least multiple client devices 110) and possibly multiple physical or geographical sites 102, 132, 142. The network configuration 100 may include a primary site 102 in communication with a network 120. The network configuration 100 may also include one or more remote sites 132, 142, that are in communication with the network 120.

The primary site 102 may include a primary network, which can be, for example, an office network, home network or other network installation. The primary site 102 network may be a private network, such as a network that may include security and access controls to restrict access to authorized users of the private network. Authorized users may include, for example, employees of a company at primary site 102, residents of a house, customers at a business, and so on.

In the illustrated example, the primary site 102 includes a controller 104 in communication with the network 120. The controller 104 may provide communication with the network 120 for the primary site 102, though it may not be the only point of communication with the network 120 for the primary site 102. A single controller 104 is illustrated, though the primary site may include multiple controllers and/or multiple communication points with network 120. In some embodiments, the controller 104 communicates with the network 120 through a router (not illustrated). In other embodiments, the controller 104 provides router functionality to the devices in the primary site 102.

A controller 104 may be operable to configure and manage network devices, such as at the primary site 102, and may also manage network devices at the remote sites 132, 134. The controller 104 may be operable to configure and/or manage switches, routers, access points, and/or client devices connected to a network. The controller 104 may itself be, or provide the functionality of, an access point.

The controller 104 may be in communication with one or more switches 108 and/or wireless Access Points (APs) 106a-c. Switches 108 and wireless APs 106a-c provide network connectivity to various client devices 110a-j. Using a connection to a switch 108 or AP 106a-c, a client device 110a-j may access network resources, including other devices on the (primary site 102) network and the network 120.

Examples of client devices may include: desktop computers, laptop computers, servers, web servers, authentication servers, authentication-authorization-accounting (AAA) servers, Domain Name System (DNS) servers, Dynamic Host Configuration Protocol (DHCP) servers, Internet Protocol (IP) servers, Virtual Private Network (VPN) servers, network policy servers, mainframes, tablet computers, e-readers, netbook computers, televisions and similar monitors (e.g., smart TVs), content receivers, set-top boxes, personal digital assistants (PDAs), mobile phones, smart phones, smart terminals, dumb terminals, virtual terminals, video game consoles, virtual assistants, Internet of Things (IOT) devices, and the like.

Within the primary site 102, a switch 108 is included as one example of a point of access to the network established in primary site 102 for wired client devices 110i-j. Client devices 110i-j may connect to the switch 108 and through the switch 108, may be able to access other devices within the network configuration 100. The client devices 110i-j may also be able to access the network 120, through the switch 108. The client devices 110i-j may communicate with the switch 108 over a wired 112 connection. In the illustrated example, the switch 108 communicates with the controller 104 over a wired 112 connection, though this connection may also be wireless.

Wireless APs 106a-c are included as another example of a point of access to the network established in primary site 102 for client devices 110a-h. Each of APs 106a-c may be a combination of hardware, software, and/or firmware that is configured to provide wireless network connectivity to wireless client devices 110a-h. In the illustrated example, APs 106a-c can be managed and configured by the controller 104. APs 106a-c communicate with the controller 104 and the network over connections 112, which may be either wired or wireless interfaces.

The network configuration 100 may include one or more remote sites 132. A remote site 132 may be located in a different physical or geographical location from the primary site 102. In some cases, the remote site 132 may be in the same geographical location, or possibly the same building, as the primary site 102, but lacks a direct connection to the network located within the primary site 102. Instead, remote site 132 may utilize a connection over a different network, e.g., network 120. A remote site 132 such as the one illustrated in FIG. 1 may be, for example, a satellite office, another floor or suite in a building, and so on. The remote site 132 may include a gateway device 134 for communicating with the network 120. A gateway device 134 may be a router, a digital-to-analog modem, a cable modem, a Digital Subscriber Line (DSL) modem, or some other network device configured to communicate to the network 120. The remote site 132 may also include a switch 138 and/or AP 136 in communication with the gateway device 134 over either wired or wireless connections. The switch 138 and AP 136 provide connectivity to the network for various client devices 140a-d.

In various embodiments, the remote site 132 may be in direct communication with primary site 102, such that client devices 140a-d at the remote site 132 access the network resources at the primary site 102 as if these clients devices 140a-d were located at the primary site 102. In such embodiments, the remote site 132 is managed by the controller 104 at the primary site 102, and the controller 104 provides the necessary connectivity, security, and accessibility that enable the remote site 132's communication with the primary site 102. Once connected to the primary site 102, the remote site 132 may function as a part of a private network provided by the primary site 102.

In various embodiments, the network configuration 100 may include one or more smaller remote sites 142, comprising only a gateway device 144 for communicating with the network 120 and a wireless AP 146, by which various client devices 150a-b access the network 120. Such a remote site 142 may represent, for example, an individual employee's home or a temporary remote office. The remote site 142 may also be in communication with the primary site 102, such that the client devices 150a-b at remote site 142 access network resources at the primary site 102 as if these client devices 150a-b were located at the primary site 102. The remote site 142 may be managed by the controller 104 at the primary site 102 to make this transparency possible. Once connected to the primary site 102, the remote site 142 may function as a part of a private network provided by the primary site 102.

The network 120 may be a public or private network, such as the Internet, or other communication network to allow connectivity among the various sites 102, 130 to 142 as well as access to servers 160a-b. The network 120 may include third-party telecommunication lines, such as phone lines, broadcast coaxial cable, fiber optic cables, satellite communications, cellular communications, and the like. The network 120 may include any number of intermediate network devices, such as switches, routers, gateways, servers, and/or controllers, which are not directly part of the network configuration 100 but that facilitate communication between the various parts of the network configuration 100, and between the network configuration 100 and other network-connected entities. The network 120 may include various content servers 160a-b. Content servers 160a-b may include various providers of multimedia downloadable and/or streaming content, including audio, video, graphical, and/or text content, or any combination thereof. Examples of content servers 160a-b include, for example, web servers, streaming radio and video providers, and cable and satellite television providers. The client devices 110a j, 140a-d, 150a-b may request and access the multimedia content provided by the content servers 160a-b.

Although 10 client devices 110a-j, or stations (STAs), are illustrated at primary site 102 in the example of FIG. 1, in various applications, a network may include a lesser or greater quantity of STA's. Indeed, some implementations may include a dramatically larger quantities of STAs. For example, various wireless networks may include hundreds, thousands, or even tens of thousands of STAs communicating with their respective APs, potentially at the same time. As noted above, various IEEE 802.11 networks may implement what is referred to as BSS coloring to increase network capacity in such dense environments. This can allow improvement and frequency reuse among network devices.

Figure 2:
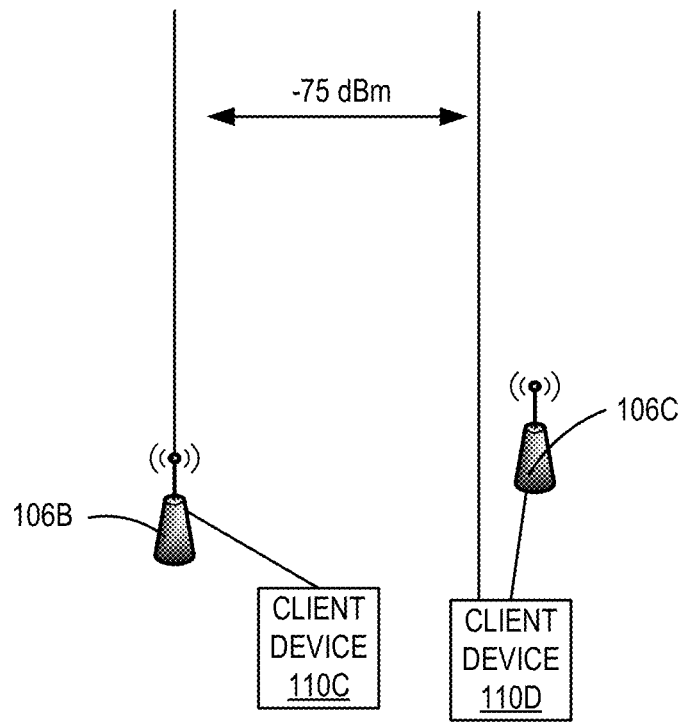
FIG. 2 illustrates an example of a spatial reuse scenario.

FIG. 2 illustrates an example of intra-BSS communication that may cause inter-BSS/OBSS interference in the context of the example network 100 (FIG. 1). In the example of FIG. 2, client device 110C (associated to AP 106B) may be transmitting data on a particular channel, e.g., channel 36, while client device 110D (associated to AP 106C) may also be operating on channel 36. Because client devices 110C and 110D are geographically close/near one another, they may be able to hear (detect) each others transmissions above the PD threshold, despite belonging to different BSSs. Because client devices' 110C/110D respective PD thresholds are being triggered by each other's energy, client devices 110C/110D are in contention with each other. Accordingly, client devices 110C/110D will take turns accessing channel 36, with each client device getting approximately half the available bandwidth (and throughput) of channel 36, but they will not necessarily interfere with each other. That is, client device 110C's energy is not considered to be interference by AP 106C as it is too far away, while client device 110D's energy is not powerful enough to be heard by AP 106B, but client devices 110C/110D are close enough to interfere, and so are prevented by the CCA function from transmitting simultaneously on channel 36. It should be understood that the above is only an example, and that inter-BSS/OBSS interference can occur between, e.g., two APs, or between an AP and a client device.

However, with SR, client devices 110C/110D can coordinate with one another and can be allowed to transmit data at the same time with a high likelihood of success because AP 106B cannot hear client device 110D, and AP 106C cannot hear client device 110C. Thus, neither of APs 106B/106C experiences interference from another's communications. The coordination comes about from the recognition (on a packet-by-packet basis) where a packet belongs to one BSS/BSSID or another BSS/BSSID. This determination can be accomplished using BSS coloring. It should be understood that the "color" is an index number, e.g., from 1 to 63, assigned to individual APs along with channel assignment, whether manually, through self-automated determination, or via external automated determination and assignment. When APs share the same channel and are in the same vicinity, they should have different BSS colors. When two BSSs operating on the same channel have the same BSS color, a condition referred to as color collision occurs, and can be detected by a client device. The client device may then alert the AP to which it is associated, prompting the AP to announce a BSS color change (via beaconing).

With BSS coloring in use, clients 110C/110D can determine whether a frame/packet is an inter- or intra-BSS frame by inspecting the BSS Color field contained in the PHY header of the frames. For all intra-BSS frames, the default PD threshold (−82 dBm) will still be used to minimize potential interference between devices in the same BSS, but in the case of an inter-BSS frame, OBSS-PD allows a more aggressive maximum PD threshold (higher than −82 and more advantageous) to be used to create more parallel transmissions, which translates into more opportunities to leverage SR. The ability to determine BSS color quickly from the preamble lets a client device receiving an inter-BSS packet drop it without demodulating the whole packet.

OBSS-PD spatial reuse allows for adjustments to the PD threshold to be made between a minimum of −82 dBm and a maximum of −62 dBm, modifying the signal detection threshold window to take advantage of an SR opportunity. The amount of adjustment allowed would be determined by the transmit power used. Lowering the transmit power reduces the potential for interference and supports a more aggressive PD value. A lower power may reduce the data rate, but increased transmit opportunities will lower latency (for the proper traffic, e.g., high-priority/low-latency traffic).

As noted above, SR only has a marginal advantage for throughput (or none at all), in large wireless deployments. Studies suggest that SR is not improving the throughput for most of the APs in such a deployment. This can be attributed to low Signal-to-Interference Noise Ratio (SINR) from OBSSs increasing the number failed transmissions, which in turn, results in the lowering of Modulation and Coding Scheme (MCS) rates. The effect is cumulative, as more time is spent on the medium, which begins to affect latency-sensitive traffic. Accordingly, SR is typically disabled in wireless deployments by default.

Figure 3:
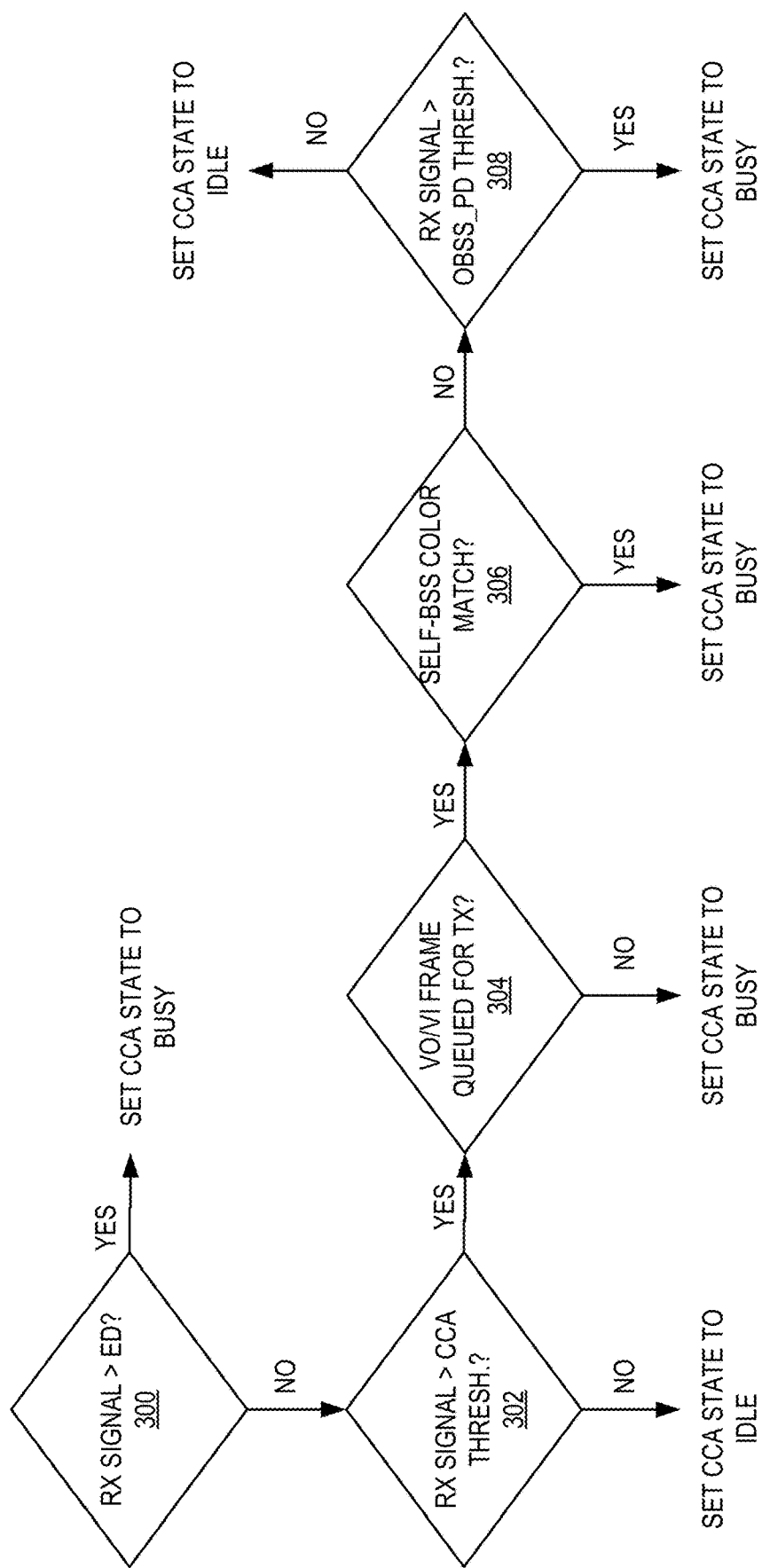
FIG. 3 illustrates example operations for effectuating selective spatial reuse to enhance channel access in accordance with one embodiment.

FIG. 3 illustrates example operations that can be performed by a client device or AP to selectively apply SR functionality. Generally, an AP or client device, upon detecting a signal in the channel/medium, attempts to determine if that signal is a WLAN signal or some random electromagnetic over-the-air signal that can be ignored, and compares the power of that signal against different SR-relevant thresholds to determine how to handle or process that signal.

At operation 300, upon receiving/detecting a signal on the operating channel, e.g., of an AP, the AP can compare the power of that signal to the energy detect (ED) threshold, which in this example (also illustrated in FIG. 5), may be −62 dBm. It should be understood that if any detected signal is above the −62 dBm threshold, nothing is transmitted by that AP. In that case, the CCA state is set to "busy" state to prevent the AP from transmitting any data/frames/packets on that channel.

If the detected signal's power is not greater than the ED threshold, at operation 302, another check is performed to determine if the received signal's power is greater than the CCA threshold, which in this example (illustrated in FIG. 4) may be −82 dBm. If the detected signal's power is not greater than that CCA threshold, regardless of what the signal may be, it is weak enough that the channel can be considered/assumed to be free. Accordingly, the CCA state can be set to idle, and the AP can commence with transmission of data that may be queued. These two operations (300/302) can be thought of as the listen-and-wait approach.

If, on the other hand, the received WLAN signal's power is greater than the CCA threshold, a determination is made as to whether or not the data queued for transmission at the AP is a high-priority or latency-sensitive frame(s)/packet(s). As noted above, one embodiment disclosed herein uses the example of traffic belonging to voice (VO) or video (VI) traffic access categories as emblematic of high-priority or latency-sensitive traffic. However, embodiments need not be limited to these two particular traffic types. If the queued data does not correspond to a high-priority or latency-sensitive traffic type, the CCA state can be set to busy, effectively prohibiting the AP from transmitting the queued data. As noted above, SR is leveraged only for high-priority or latency-sensitive traffic in accordance with embodiments, as the use of SR results in reduced channel/medium access times for such traffic. When the queued data does not correspond to high-priority or latency-sensitive traffic, the use of SR does not result in any appreciable advantages (there is no need to reduce channel/medium access times for traffic that is not latency-sensitive—such traffic can withstand delays in accessing the operating channel/medium of the AP).

The other above-discussed aspect of SR is the coordinated, and simultaneous transmission of data on the same channel (between two OBSSs). That is, the SR function should only be used when the APs simultaneously transmitting data on the same channel are in different BSSs, i.e., they are associated with different BSSIDs. Thus, at operation 306, a check can be performed to determine whether the BSS color associated/indicated in the detected signal is the same as the BSS color of the AP (that detected the signal). It should be noted that BSS color can be determined from the detected signal's preamble without a need to decode the payload/entire packet. If so, the CCA state can be set to busy, preventing the AP from transmitting any data to avoid a color overlap/collision at the AP. That is, if the AP is allowed to transmit when another transmission is occurring (detected signal) with the same BSS color, that AP transmission will interfere or collide with the detected signal. In other words, allowing the AP to transmit would interfere with communications in its own BSS. If not, the detected signal and the data queued for transmission by the AP will not result in a collision, and the AP can potentially commence with transmitting its queued data. It should be noted that in some embodiments the order of operation can vary. For example, in one embodiment, operation 306 (the check for self-BSS color match) can occur prior to operation 304 (the check for queued frame type).

Figure 5:
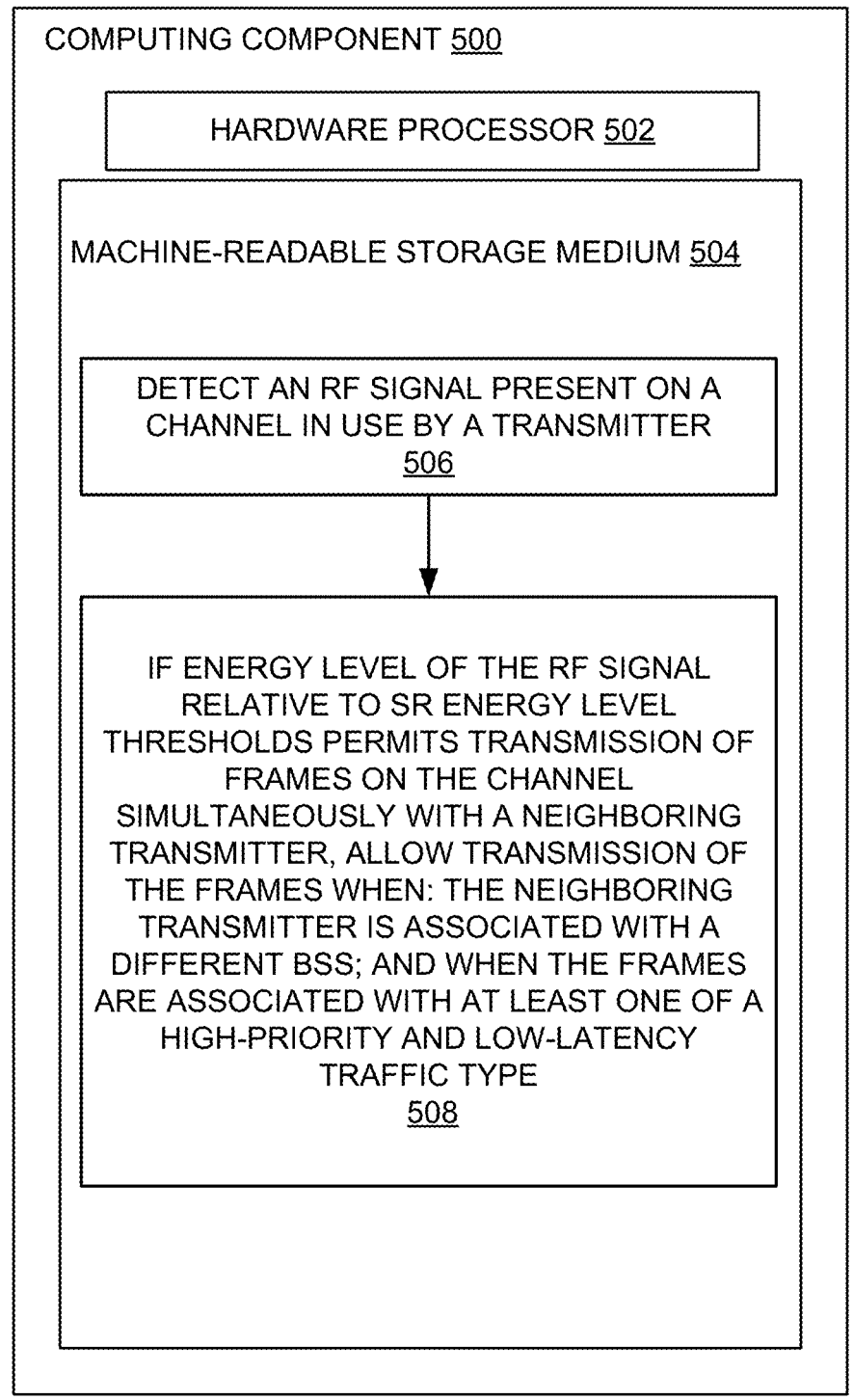
FIG. 5 is a block diagram of an example computing component or device for selective spatial reuse in accordance with one embodiment.

At operation 308 (if the BSS color of the detected signal and that of the AP is not the same), a check can be performed to determine if the detected signal's power is greater than that of the OBSS_PD threshold (which as shown in FIG. 5 can be, in this example, −72 dBm. If the detected signal's power exceeds the OBSS_PD threshold, the CCA state can be set to busy, the AP is prevented from transmitting its queued data at that time. As alluded to above, the OBSS_PD threshold can vary, but generally, the OBSS_PD threshold is set at some power that limits how close APs can operate in a given space to ensure interference-free access to the same channel/medium. If the detected signal's power does not exceed the OBSS_PD threshold, the CCA state can be set to idle, and the AP may be allowed to transmit its queued frames (that correspond to the high-priority/latency-sensitive traffic access categories or traffic types). It should be understood that whether the AP's queued data actually gets transmitted may depend on the continuing Enhanced Distributed Channel Access (EDCA) backoff associated with the prioritization of channel access in accordance with access categories (VO, VI, background (BK) and Best Effort (BE)). Again, this consideration applies for high-priority/latency-sensitive traffic in the context of these known traffic access categories. A similar mechanism may not be needed/used (or a different mechanism) may be used when selective SR disclosed herein is applied to other types of high-priority/latency-sensitive traffic.

As noted above, embodiments of the present disclosure apply to client devices as well as APs. Accordingly, it should be understood that a client device, relative to signals it hears, may perform the same operations as those discussed above to determine whether or not it may transmit queued data/frames on a channel in the context of SR.

Figure 4:
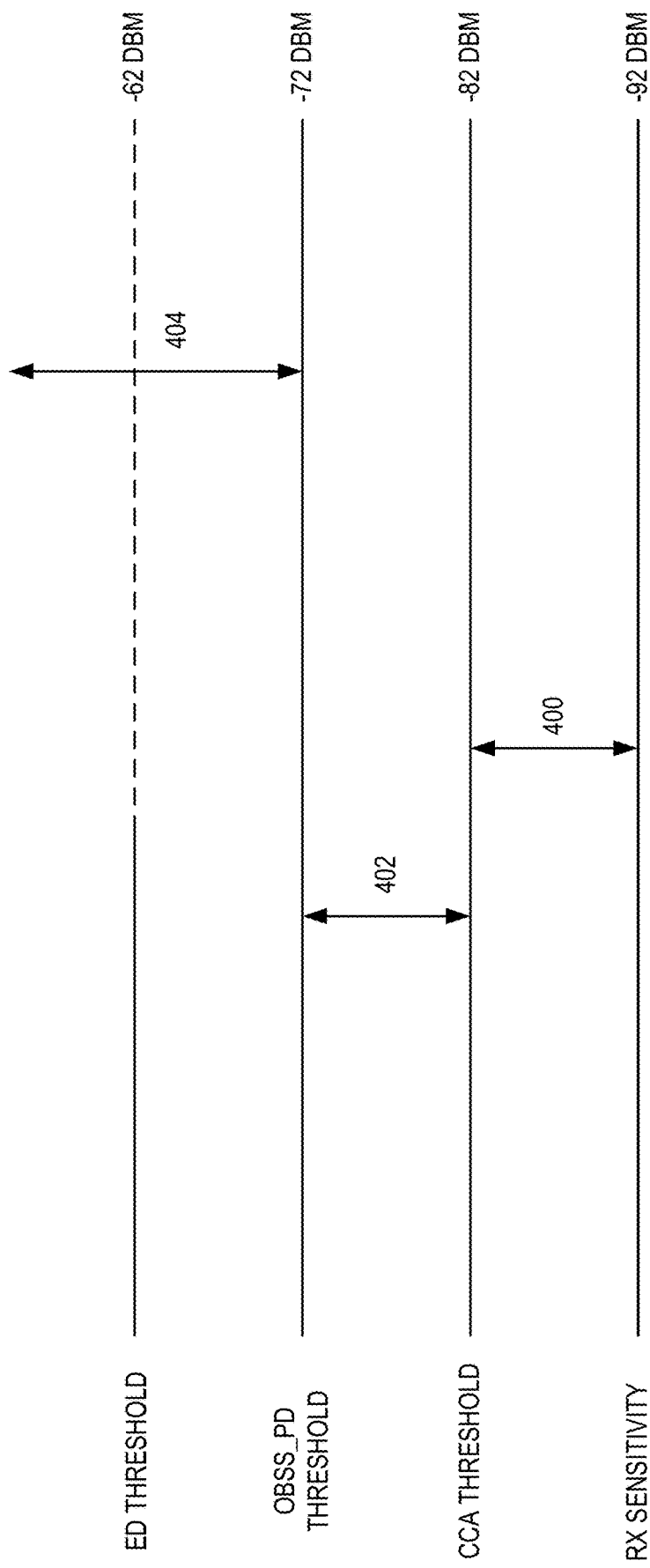
FIG. 4 illustrates example spatial reuse thresholds and the effect of their application at a transmitter in accordance with one embodiment.

FIG. 4 illustrates the resulting effect of the above-discussed selective SR application method. FIG. 4 illustrates the different thresholds that can be applied at a transmitter (of an AP or client device). In this example, the threshold values are as follows: ED threshold of −62 dBm; OBSS_PD threshold of −72 dBm; CCA threshold of −82 dBm; and Rx sensitivity threshold of −92 dBm. It should be understood that the Rx sensitivity threshold refers to a signal strength/power below which, a device is typically unable to detect a WLAN signal. In particular, when a detected signal power is above the Rx sensitivity threshold (signified by arrow 400), the transmitter (of an AP or client device) may proceed with transmitting data. Between the CCA threshold and the OBSS_PD threshold (signified by arrow 402), only high priority/latency-sensitive frames can be transmitted (i.e., the result of the more granular/selective application of SR in accordance with various embodiments). In essence, this boundary of OBSS_PD and CCA thresholds makes a transmitter which has VO/VI or other high priority/latency sensitive frame(s) queued, less blocked to non-VO traffic being sent in the adjoining OBSS, i.e., allows for greater probability of accessing the channel/medium. Above the OBSS_PD threshold (signified by arrow 404), all frames are blocked from being transmitted.

It should be understood that the above-described thresholds/checks act as filters. It should be understood that more filters (along with queued high-priority/latency-sensitive frames) can be applied to make embodiments more flexible (or robust). Such filters/thresholds can include, e.g., some particular threshold number of high-priority/latency-sensitive frames, some specified size of high-priority/latency-sensitive frames, certain PHY layer parameters to transmit the high-priority/latency-sensitive frames (e.g., modulation and coding scheme (MCS), number of spatial streams (SS), guard interval (GI), etc.). For example, if a lower MCS rate is expected to be applied to a queued high-priority/latency-sensitive frame, it is more likely to be successfully transmitted.

FIG. 5 is an example computing component 500 that may be used to implement various features of an elected merge leader in accordance with one embodiment of the disclosed technology. Computing component 500 may be, for example, a server computer, a controller, or any other similar computing component capable of processing data. In the example implementation of FIG. 5, the computing component 500 includes a hardware processor 502, and machine-readable storage medium 504. In some embodiments, computing component 500 may be an embodiment of processor of an AP or client device (FIGS. 1 and 2).

Hardware processor 502 may be one or more central processing units (CPUs), semiconductor-based microprocessors, and/or other hardware devices suitable for retrieval and execution of instructions stored in machine-readable storage medium 504. Hardware processor 502 may fetch, decode, and execute instructions, such as instructions 506-508, to control processes or operations for selective application or utilization of SR. As an alternative or in addition to retrieving and executing instructions, hardware processor 502 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 504, may be any electronic, magnetic, optical, or other physical storage device that contains or stores executable instructions. Thus, machine-readable storage medium 504 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 504 may be a non-transitory storage medium, where the term "non-transitory" does not encompass transitory propagating signals. As described in detail below, machine-readable storage medium 504 may be encoded with executable instructions, for example, instructions 506-508.

Hardware processor 502 may execute instruction 506 to detect an RF signal present on a channel in use by a transmitter. As noted above, the transmitter may be an AP transmitter or a client device transmitter. The transmitter attempts to determine whether the detected signal is a WLAN signal or some other (irrelevant electromagnetic) signal that need not be considered.

Hardware processor 502 may execute instruction 508 to allow transmission of the frames (queued to be transmitted by the transmitter) if the energy/power level of the RF signal relative to certain SR energy level-relevant thresholds permits transmission of frames by the transmitter simultaneously in use by a neighboring transmitter when: the neighboring transmitter is associated with a different BSS, and when the frames are associated with at least one of a high-priority/low-latency/latency-sensitive type of traffic. That is, the conventional use of SR can be enhanced/adapted for use or application only when frames to be transmitted by a transmitter would benefit for quicker access to a channel/medium over which the transmitter is operating. It should be understood that as described in the present disclosure, BSSs can be distinguished based on a BSS color assignment. However, another identifier/characteristic can be used as a basis for determining whether a transmission comes from a different BSS (or different groupings upon which frequency or spatial reuse may be premised).

Figure 6:
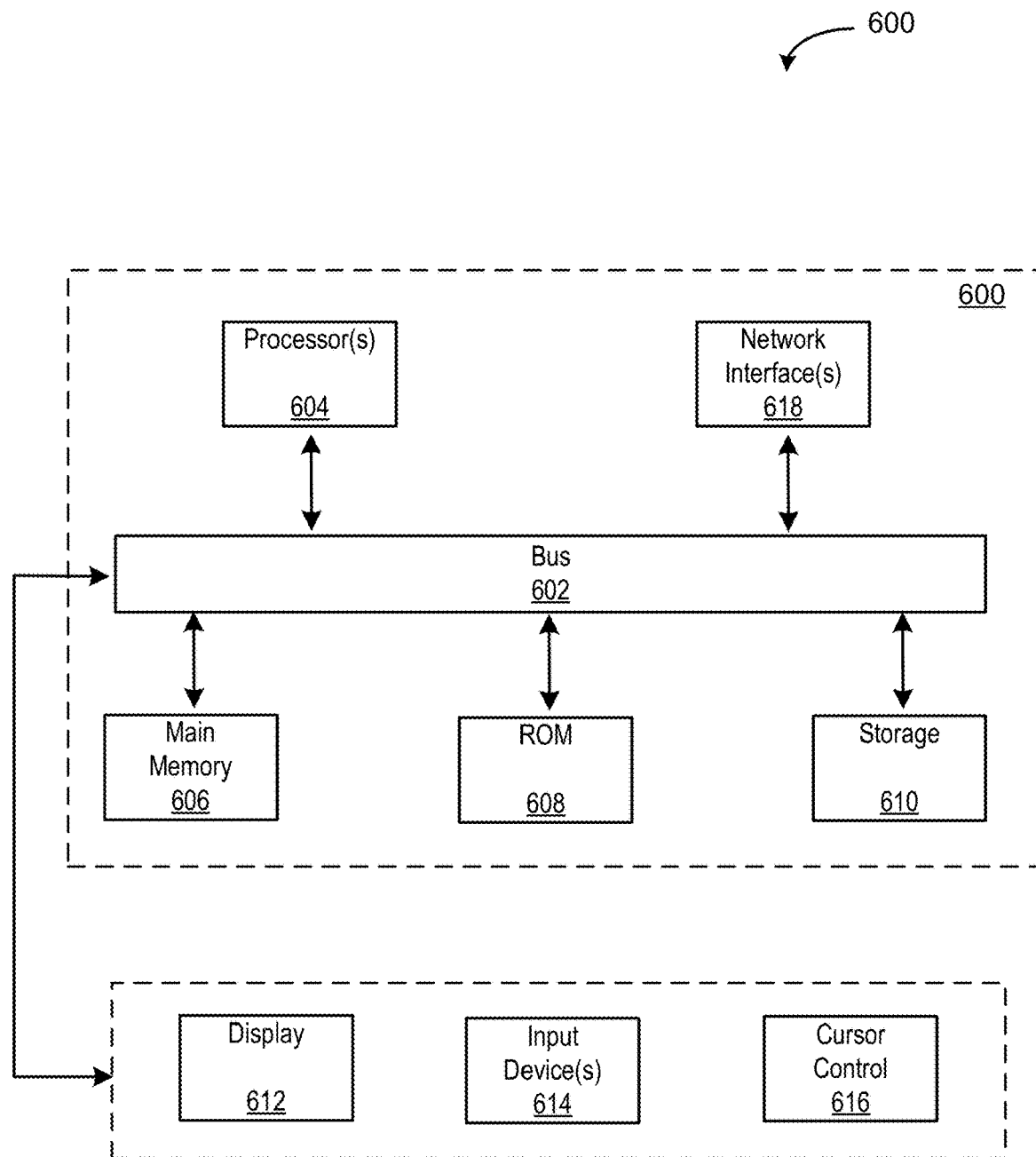
FIG. 6 is an example computing component that may be used to implement various features of embodiments described in the present disclosure.

FIG. 6 depicts a block diagram of an example computer system 600 in which various of the embodiments described herein may be implemented. The computer system 600 includes a bus 602 or other communication mechanism for communicating information, one or more hardware processors 604 coupled with bus 602 for processing information. Hardware processor(s) 604 may be, for example, one or more general purpose microprocessors.

The computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

The computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

The computer system 600 may be coupled via bus 602 to a display 612, such as a liquid crystal display (LCD) (or touch screen), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. In some embodiments, the same direction information and command selections as cursor control may be implemented via receiving touches on a touch screen without a cursor.

The computing system 600 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 602. Transmission media can also take the form of acoustic or light waves, such as those generated during radio-wave and infra-red data communications.

The computer system 600 also includes a communication interface 618 coupled to bus 602. Network interface 618 provides a two-way data communication coupling to one or more network links that are connected to one or more local networks. For example, communication interface 618 may be an integrated services digital network (ISDN) card, cable modem, satellite modem, or a modem to provide a data communication connection to a corresponding type of telephone line. As another example, network interface 618 may be a local area network (LAN) card to provide a data communication connection to a compatible LAN (or WAN component to communicated with a WAN). Wireless links may also be implemented. In any such implementation, network interface 618 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 618, which carry the digital data to and from computer system 600, are example forms of transmission media.

The computer system 600 can send messages and receive data, including program code, through the network(s), network link and communication interface 618. In the Internet example, a server might transmit a requested code for an application program through the Internet, the ISP, the local network and the communication interface 618.

The received code may be executed by processor 604 as it is received, and/or stored in storage device 610, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 600.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like. The presence of broadening words and phrases such as "one or more," "at least," "but not limited to" or other like phrases in some instances shall not be read to mean that the narrower case is intended or required in instances where such broadening phrases may be absent.

What is claimed is:

1. A non-transitory machine-readable storage medium encoded with instructions executable by a hardware processor of a computing component, the machine-readable storage medium comprising instructions to cause the hardware processor to:
   detect a radio frequency (RF) signal present on a channel in use by a transmitter;
   determine that an energy level of the RF signal is greater than at least one energy level threshold;
   based on the determination that the energy level of the RF signal is greater than the at least one energy level threshold, determine that frames, to be transmitted on the channel by the transmitter, are associated with at least one of a high-priority and low-latency traffic type;
   in response to the determination that the frames are associated with at least one of a high-priority and low-latency traffic type, determine that the RF signal is associated with a different basic service set (BSS) than that of the transmitter, and that the energy level of the RF signal is greater than an overlapping BSS Packet-Detect (OBSS PD) threshold; and
   allow transmission of the frames in response to the determination that the RF signal is associated with a different BSS, and that the energy level of the RF signal is greater than the OBSS PD threshold.

2. The non-transitory machine-readable storage medium of claim 1, wherein the energy level threshold comprises at least one of an energy detect (ED) threshold and a clear channel access (CCA) threshold.

3. The non-transitory machine-readable storage medium of claim 2, wherein the instructions further cause the hardware processor to set a CCA state of the computing component to a busy state in response to a determination that the energy level of the RF signal is greater than the ED threshold.

4. The non-transitory machine-readable storage medium of claim 3, wherein the instructions further cause the hardware processor to set a CCA state of the computing component to an idle state in response to a determination that the energy level of the RF signal is not greater than the ED threshold and a determination that the energy level of the RF signal is not greater than the CCA threshold.

5. The non-transitory machine-readable storage medium of claim 4, wherein the instructions further cause the hardware processor to set the CCA state to a busy state in response to a determination that the frames are not associated with at least one of a high-priority and low-latency traffic type.

6. The non-transitory machine-readable storage medium of claim 5, wherein the instructions further cause the hardware processor to set the CCA state to a busy state in response to a determination that the RF signal is associated with the same BSS as that of the transmitter.

7. The non-transitory machine-readable storage medium of claim 6, wherein the instructions further cause the hardware processor to set the CCA state to a busy state in response to a determination that the RF signal is greater than the OBSS_PD threshold.

8. The non-transitory machine-readable storage medium of claim 7, wherein the instructions further cause the hardware processor to set the CCA state to an idle state in response to a determination that the RF signal is not greater than the OBSS_PD threshold.

9. The non-transitory machine-readable storage medium of claim 1, wherein the instructions further cause the hardware processor to determine that frames are associated with at least one of a high-priority and low-latency traffic type, when the frames meet a high-priority and low-latency traffic-related requirement.

10. The non-transitory machine-readable storage medium of claim 9, wherein the high-priority and low-latency traffic-related requirement comprises at least one of a threshold number of frames comprising high-priority and low-latency traffic types, a threshold size of frames comprising high-priority and low-latency traffic types, and use of physical layer parameters for transmitting the frames.

11. The non-transitory machine-readable storage medium of claim 1, wherein the computing component comprises one of a computing component of an access point or a computing component of a client device.

12. A network device, comprising:
   a processor; and
   a memory unit operatively connected to the processor and including computer code that when executed causes the processor to:
      detect a radio frequency (RF) signal present on a channel in use by a first transmitter;
      compare an energy level of the RF signal to a plurality of spatial reuse (SR) energy level thresholds;
      determine that the energy level of the RF signal is greater than a first SR energy level threshold of the plurality of SR energy level thresholds;
      based on the determination that the energy level of the RF signal is greater than the first SR energy level threshold, identify that frames, to be transmitted by on the channel by the first transmitter, are associated with at least one of a high-priority and low-latency traffic type;
      upon the determination that the frames are associated with at least one of a high-priority and low-latency traffic type, determine that the RF signal is from a second transmitter of a neighboring network device operating in an overlapping basic service set (OBSS) associated with a different basic service set (BSS) color than that of the network device, and that the energy level of the RF signal is within an energy level boundary defined by an overlapping BSS Packet-Detect (OBSS PD) threshold of the plurality of SR energy level thresholds; and
      upon the determination that the energy level of the RF signal is within the energy boundary defined by the overlapping BSS Packet-Detect (OBSS PD) threshold of the plurality of SR energy level thresholds and that the neighboring network device is operating in an overlapping basic service set (OBSS) associated with a different basic service set (BSS) color than that of the network device, permit transmission of frames, by the first transmitter, on the channel simultaneously with the RF signal from the second transmitter of the neighboring network device.

13. The network device of claim 12, wherein the plurality of SR energy level thresholds comprise a clear channel access (CCA) threshold and the OBSS_PD threshold.

14. The network device of claim 13, wherein the computer code, that when executed, further causes the processor to set a CCA state of the first transmitter to idle to permit the transmission of the frames.

15. The network device of claim 14, wherein the CCA threshold is lower than the OBSS PD threshold.

16. The network device of claim 12, wherein the network device comprises one of a wireless local area network (WLAN) access point or a WLAN client device.

17. The network device of claim 12, wherein the at least one of the high-priority and low-latency traffic type comprises a voice (VO) traffic type or a video (VI) traffic type.

18. The network device of claim 12, wherein the computer code further causes the processor to compare the energy level of the RF signal to an energy detect (ED) threshold.

19. The network device of claim 18, wherein the computer code further causes the processor to prohibit the transmission of the frames upon a determination that the energy level of the RF signal exceeds the ED threshold.

20. The network device of claim 12, wherein the computer code further causes the processor to compare the energy level of the RF signal to a received signal sensitivity threshold, and wherein the computer code further causes the processor to permit transmission of all queued frames upon a determination that the energy level of the RF signal exceeds the received signal sensitivity threshold including frames not associated with the at least one of a high-priority and low-latency traffic type.

21. The non-transitory machine-readable storage medium of claim 1, wherein the instructions further cause the hardware processor to adjust the OBSS_PD threshold based on a transmit power for the frames.

* * * * *